United States Patent Office 3,108,842
Patented Oct. 29, 1963

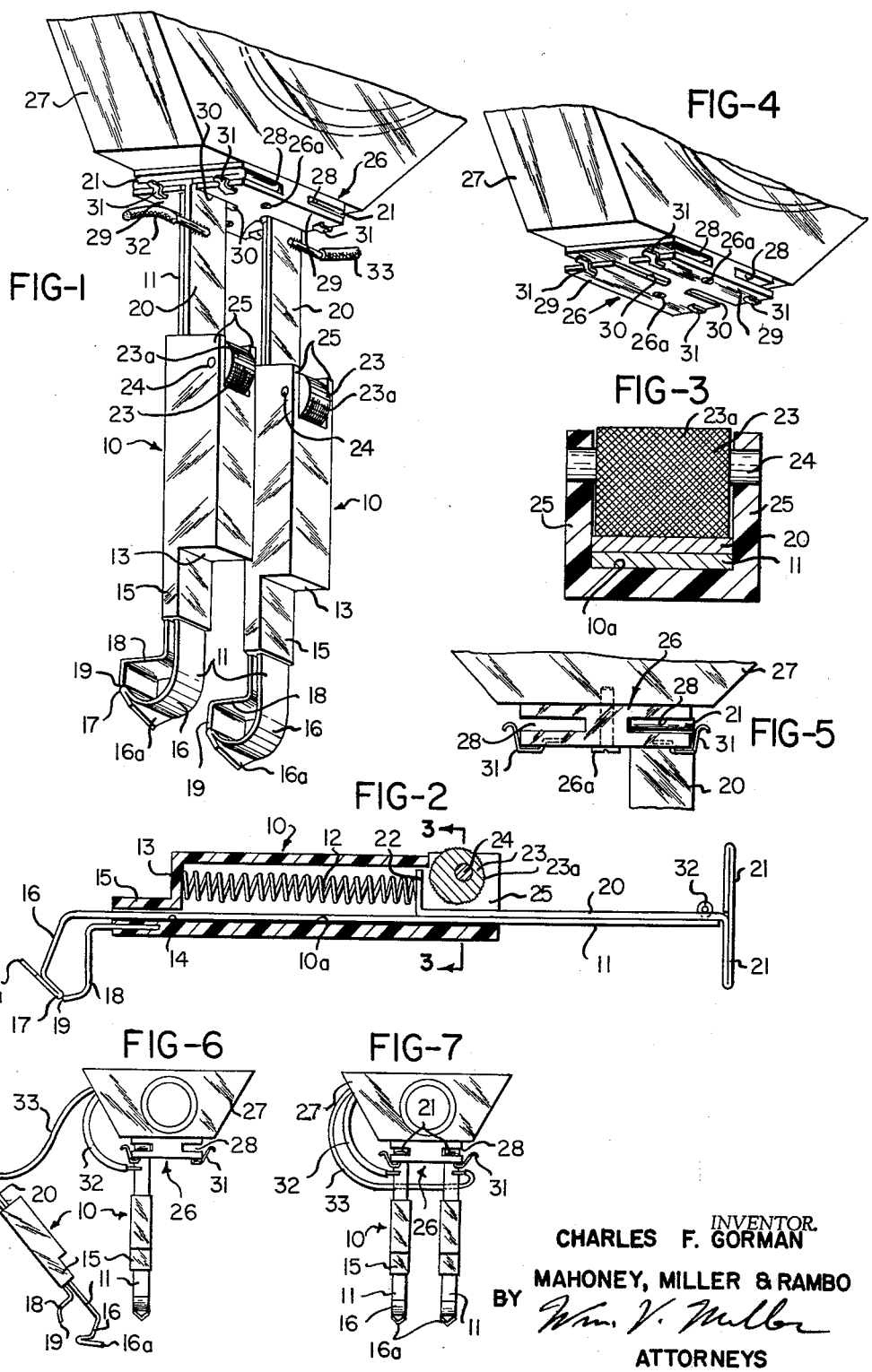

3,108,842
TEST PROBE AND SUPPORTING
BRACKET THEREFOR
Charles F. Gorman, 27 W. Elm St., Monroe, Ohio
Filed July 18, 1962, Ser. No. 210,769
2 Claims. (Cl. 339—108)

This invention relates in general to an electric test probe. It relates, more specifically, to a combination clamp type probe unit having a locking device and supporting bracket.

In electrical testing apparatus of the type having an indicating unit for determining the operative condition of an electrical component, it is necessary to provide one or more test leads for interconnecting the indicating unit with the component to be tested. The free ends of the test leads generally have test probes attached thereto for facilitating connection to the component under test. In portable type testing apparatus, it becomes extremely difficult for one technician to carry or support the indicating unit while simultaneously manipulating the test probes. An example of such use is in the testing of storage batteries installed in vehicles by a device commonly referred to as a battery tester. There are no convenient or stable platforms on which to place the tester while the technician manipulates the test probes. The test probes are usually of the type having an insulated handle with a sharpened electrically conducting contact point which must be forcibly held in contact with the desired terminal of the battery during a testing operation. As a consequence, an additional technician is generally required to assist in the testing by either holding the indicating unit or manipulating the test probes. This necessarily results in higher operating costs as well as inconvenience to the technician.

It is the primary object of this invention to provide a test probe for electrical testing instruments having a pair of relatively movable jaws actuated by a compression spring for securely clamping a terminal or conductor therebetween.

It is a further object of this invention to provide a clamp type test probe having a selectively operable locking device to prevent relative separating movement of a pair of jaws.

It is a still further object of this invention to provide a test probe supporting bracket attachable to a portable indicating instrument for cooperatively engaging and rigidly supporting a test probe in fixed operative relationship thereto.

These and other objects and advantages of this invention will be readily apparent from the following detailed description of an embodiment thereof and the accompanying drawing.

In the drawing:

FIGURE 1 is a perspective view of a pair of the test probes of this invention supported on a bracket attached to a meter case.

FIGURE 2 is an enlarged medial longitudinal sectional view of the test probe.

FIGURE 3 is a transverse sectional view on an enlarged scale taken along line 3—3 of FIGURE 2.

FIGURE 4 is a perspective view of the probe supporting bracket.

FIGURE 5 is a vertical elevational view of the bracket.

FIGURE 6 is a diagrammatic view of a meter provided with a supporting bracket with one of the probes attached thereto.

FIGURE 7 is a similar diagrammatic view of a meter with two probes attached to the supporting bracket in spaced relationship.

Referring to the drawings, the clamp type probe, illustrated best in FIGURES 1 and 2, comprises in general an elongated tubular housing 10, a relatively movable jaw 11, and a compression spring 12. The housing 10 is formed with a flat internal surface portion 10a along which the movable jaw 11 is slidably disposed. A transversely extending wall member 13 is formed at one end of the housing 10 and terminates in an edge spaced parallel to the surface portion 10a defining a rectangularly shaped passageway 14. Integrally formed with the housing 10 is a rectangularly shaped, tubular nose section 15 which extends a distance axially outwardly from the end wall 13 forming a continuation of the passageway 14. The housing 10 may be fabricated of any suitable material possessing a sufficient structural strength. If desired, the housing may be fabricated from a molded electrically insulating plastic material forming an insulated handle. Although the shape of the housing 10 is of rectangular cross section, other configurations may also be utilized for specific applications.

Extending axially through the housing 10 is the movable jaw 11 comprising an elongated, flat strip of electrically conductive material rectangular in cross section. The jaw 11 is disposed in sliding engagement with the surface portion 10a of the housing and extends through the passageway 14 which serves as a guide. One end of the movable jaw 11 extending axially outward from the nose section 15 is bent laterally forming a contact 16. The contact 16 terminates in a rearwardly directed, folded portion having a straight edge 17. The edge 17 cooperates with a relatively fixed or stationary jaw 18 consisting of a flat strip of metal having one end thereof embedded in the wall portion of the nose section 15 or otherwise secured thereto in any suitable manner. The fixed jaw 18 is also bent laterally having a forwardly directed terminal edge 19 which is disposed in parallel relationship to the edge 17 of the movable jaw 11. The edge 17 of the contact 16 and the edge 19 of the fixed jaw 18 are disposed equidistantly from the housing 10 and will contact when fully closed. Thus, an object positioned between the edge 17 and 19, when separated, will be securely gripped by the jaws. The opposite end of the folded portion of the contact 16 extends a distance axially therefrom forming a contact point 16a which is preferably of V-shape.

The movable jaw 11 extends a distance axially outward from the opposite open end of the housing 10. Rigidly secured to this portion of the jaw 11 is a similar flat strip of metal 20 having one end terminating within the housing 10 in a laterally extending lug 22. Disposed within the interior of the housing 10 is the spring member 12, consisting of a helically wound wire compression spring. The opposite ends of the spring 12 are disposed in contacting engagement with the interior surface of the end wall 13 and the opposed surface of the lug 22. The movable jaw 11 may thus be moved axially against the compressive force of the spring 12 to separate the edges 17 and 19 of the jaws. Removal of the compressive force will allow the spring 12 to urge the movable jaw in a direction causing the edge 17 thereof to engage and clamp an object such as a conductor or terminal against the fixed jaw 18.

Carried on the housing 10 is a selectively operable locking device for engaging the movable jaw 11 and preventing movement thereof which would separate the edges 17 and 19 of the jaws. The locking member is of the cam type comprising a cylinder 23 having a knurled surface 23a which is eccentrically mounted for rotation on a shaft 24. The shaft 24 is fixed in spaced parallel, longitudinally extending side walls 25 integrally formed with the housing 10 to support the cylinder 23 in cooperative relationship to the movable jaw 11. The cylinder 23 is movable from an unlocked position (FIGURE 2) where the knurled surface 23a is not in contact with the adjacent surface of the strip 20 to a locked position (see FIGURE 3) wedging the movable jaw 11 against the surface portion 10a of the housing. When in the locked position, the cylinder 23 will prevent axial movement of the movable jaw relative to the housing 10 which would separate the edges 17 and 19 of the jaws. Increasing the force applied to the movable jaw 11 will correspondingly increase the locking force produced by the eccentrically mounted cylinder 23. The cylinder 23 may be readily moved to either of the positions by merely rotating the cylinder with the thumb. For this purpose, the housing 10 does not extend over the cylinder 23.

The opposite end of the strip 20 is folded to form a pair of laterally extending flanges 21 for cooperatively engaging a supporting bracket 26. The bracket 26 is secured by means of spacing bolts 26a to the case portion of a meter 27 or other indicating instrument. The bracket 26 consists of a rectangular block of electrically insulating material formed with a pair of oppositely directed outwardly opening slots 28. Each slot 28 is of a width and depth to fully receive the flanges 21 of the folded metal strip 20. One side 29 of each slot 28 is also provided with a relatively narrow, longitudinally extending slot 30 for receiving the strip 20 of the support member and the terminal end of the movable jaw 11. With the flanges 21 disposed in their respective slots 28, the probes will extend downwardly from the meter and be rigidly connected thereto. To retain the flanges 21 in their slots 28, a pair of spring clips 31 are attached to each end of the bracket 26. Each spring clip 31 consists of a flat strip of resilient material having one end thereof embedded in the side 29 of the bracket or otherwise suitably attached thereto with the opposite free end extending upwardly toward the meter 27 and partially blocking the slot 28. The free end of each clip 31 is preferably arcuately curved to facilitate entry or removal of the flanges 21 from the slot 28.

In the operation of a meter equipped with test probes constructed in accordance with this invention, the test probes, which are connected by their respective leads 32 and 33 to the meter 27, may either be attached to the bracket 26 or manually held as required by the specific application. As illustrated in FIGURE 6, one probe is attached to the bracket 26 to permit holding thereof along with the meter 27. The test probe attached to the meter may thus be positioned with the contact point 16a in electrical contact with an appropriate terminal or conductor of the circuit under test. The other probe may be readily moved to the second desired location to complete the electrical circuit. The meter 27 is supported, with the attached probe, by one hand permitting the technician to easily manipulate the other probe with his free hand.

If desired, the probe which is not attached to the bracket 26 may be readily clamped to a terminal or conductor of the circuit under test. This is readily accomplished by forcing the movable jaw 11 axially through the housing 10 against the compressive force of the spring 12 to separate the edge 17 from the edge 19 of the fixed jaw 18. After positioning the terminal or conductor between the relatively spaced edges 17 and 19, the compressive force is released from the movable jaw 11 allowing the spring 12 to clamp the terminal conductor between the edges 17 and 19. The technician's hands will thus be free to either support the meter 27 or make adjustments to the circuit being tested. Manually rotating the cam-type locking cylinder 23 into engagement with the opposed surface of the leg 21 will prevent release of the terminal or conductor from between the movable and fixed jaw.

As another example of operation, both probes may be attached to the bracket 26 as illustrated in FIGURE 7. Each probe is thus relatively spaced in fixed relationship. The meter 27 may be conveniently held in one hand to position the spaced contact points 16a on the appropriate terminals of the electrical apparatus under test. This is particularly desirable in the testing of storage batteries, such as those normally utilized on automotive type vehicles. For such an application, the bracket 26 is preferably dimensioned to space the probes at a distance equal to the terminal spacing of each individual cell. The technician may, therefore, hold the meter in one hand to place the contact points 16a in engagement with the respective terminals of the battery cells in a circuit.

It is readily apparent that the test probe of this invention will securely clamp a conductor or terminal of an electrical circuit under test between the relatively movable jaws thereby forming a suitable electrical contact. The cam-type locking device prevents relative movement of the jaws to inadvertently release a terminal or conductor clamped therebetween. The supporting bracket attached to the case of an indicating instrument permits the test probes to be carried by instrument thereby facilitating the operation thereof.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination; a test probe having an elongated tubular housing, a stationary jaw carried by said housing, an electrically conductive jaw slidably disposed within said housing and movable longitudinally relative thereto to exert a clamping force against said stationary jaw, said movable jaw including laterally extending flanges formed at one end thereof; and a bracket having a slot formed therein for receiving the flanges of said movable jaw to support said probe in fixed relationship.

2. In the structure of claim 1, a bracket including a plurality of resilient clips disposed in cooperative relationship to said slot for retaining the flanges of said movable jaw therein.

References Cited in the file of this patent
UNITED STATES PATENTS

| | | |
|---|---|---|
| 340,233 | McNally | Apr. 20, 1886 |
| 1,960,191 | Staub et al. | May 22, 1934 |
| 2,529,270 | Webster | Nov. 7, 1950 |
| 2,574,043 | Lannou | Nov. 6, 1951 |
| 2,581,497 | Podell | Jan. 8, 1952 |
| 2,753,541 | Leonard | July 3, 1956 |